April 2, 1963 P. M. BUHLER 3,084,232
TESTING AND HALF-TAPPING MEANS FOR TELEPHONE LINES
Filed April 9, 1962
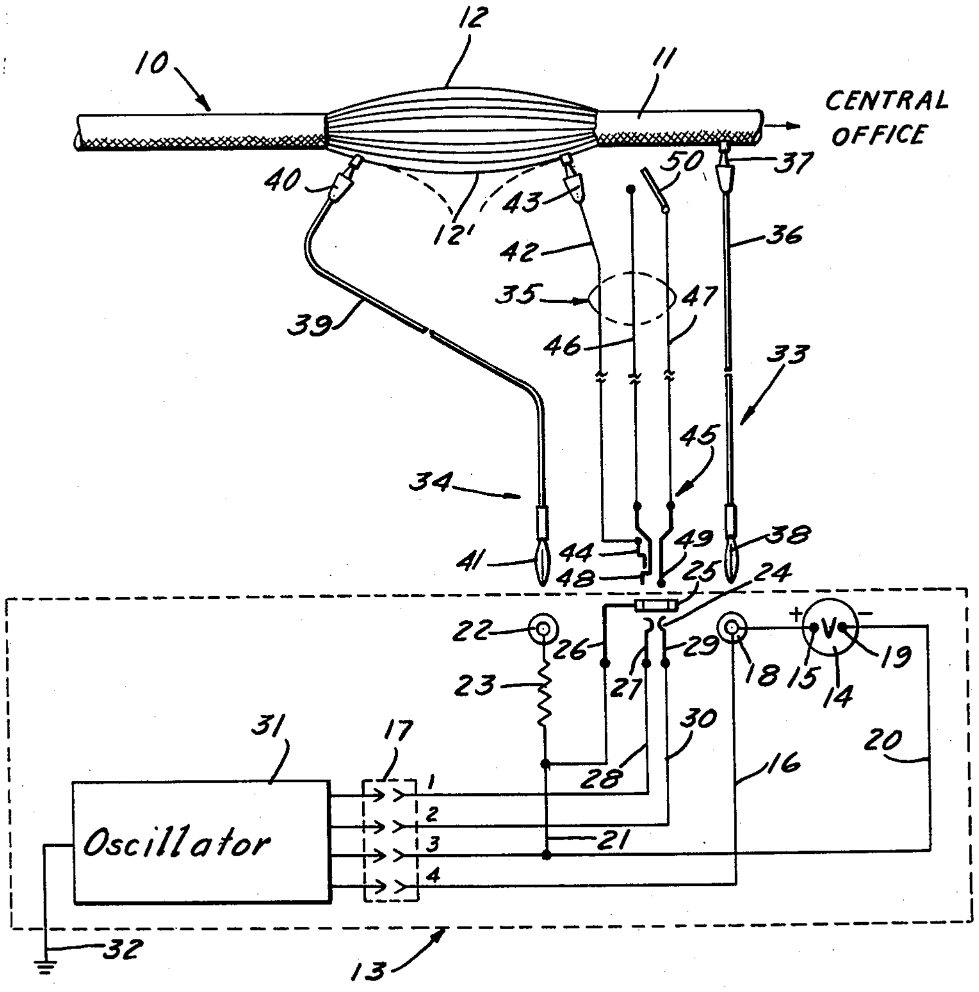
Peter M. Buhler, INVENTOR.
BY Paul A. Weilein
Attorney United States Patent Office 3,084,232

Patented Apr. 2, 1963

3,084,232

TESTING AND HALF-TAPPING MEANS FOR TELEPHONE LINES

Peter M. Buhler, 4807 N. Baldwin Ave., Temple City, Calif.

Filed Apr. 9, 1962, Ser. No. 186,267
8 Claims. (Cl. 179—175)

The present invention relates generally to telephone line testing and alterations thereof, and more particularly to field testing of telephone lines to determine whether such lines are in service, and means whereby line conductors may be opened without service interference or interruption.

The present invention constitutes improvements in the invention disclosed in my co-pending application covering System for Testing Telephone Lines, Serial No. 658,418, filed May 10, 1957.

My co-pending application provides a system utilizing a field testing device for determining the use or non-use of the circuit without having to listen in on conversation taking place on the circuit, so that, if the circuit is not in use, an audible signal may be imposed thereon for identifying the circuit in the usual manner.

More specifically, the system of my co-pending application utilizes a line tap, a voltmeter or other device connected with said tap so that upon connection of the tap with a circuit which is in use, the voltmeter or other device will so indicate, and if the circuit is idle the voltmeter will indicate this condition, and a tone producing device such as an oscillator selectively connectable in the circuit between the tap and voltmeter, when the voltmeter indicates the telephone circuit to be idle, thus enabling identification of the circuit without interruption of service or other annoyance to a subscriber.

A further problem closely associated with that of identifying the telephone line circuits and whether they are in use, arises with respect to the present procedures used by the telephone companies for opening cable splices and conductors when making transfers, legging in other cables for branch splices, cutting out slack, and other operations requiring the opening of circuits.

Heretofore, the established practices required that the first operation, when a splice is to be opened, is to identify all special circuits from the central office. The test board man at the central office then sends a tone signal on each special circuit and the splicer picks up the tone with an amplifier.

When the splicer is ready to cut a special identified circuit, he calls the test board man and asks for permission to cut the circuit. The test board man then calls the subscriber to get the circuit released. Upon obtaining release, the test board man then gives the splicer permission to make the cut, after which he advises the test board man. The test board man then tests the line and calls the subscriber again to tell the subscriber that the circuit is again operable.

Such a procedure, in addition to being an annoyance to the subscriber and putting the line out of commission for periods of an hour or more, is also uneconomical in that it requires the services of the test board man, and the splicer for a longer period of time, as well as the time of the subscriber.

The present application proposes to extend the usefulness of the broad concept of the above-mentioned co-pending application, and provides means whereby it will be possible also to open a cable conductor of a telephone line, which is in use, without interference or the knowledge of the user, and by operations conducted in the field without the necessity of the services of the test board man at the central office. Briefly, in this broad concept, the present invention proposes to provide the voltmeter or potential responsive device with a main tapping circuit and a half-tapping circuit, these two circuits having different resistance components so that there will be a visible difference in the indicated voltage, depending upon which circuit is tapped to the line conductor. The voltage readings thus form a visual indication and assures the user that contact has in fact been established with the conductor through the tapping circuits. By connecting the tapping circuits at spaced points on the conductor, an auxiliary electric flow path is established which permits opening of the line between these two points without interference or interruption of the service.

In its broad concept, the present invention has for one object the provision of field testing means which will identify the condition of a telephone circuit, and which may be utilized to permit the opening of a conductor in the field without interference or interruption of service on the line, and without the aid of personnel in the central office.

A further object of the invention is to provide main and half-tapping circuits in connection with an indicating device, these tapping circuits being operable independently for determining the line condition, and cooperably to enable opening of a line without service interruption when making transfers, legging in other cables for branch splices, cutting out slack, and other operations.

Further objects of the invention will be brought out in the following part of the specification, wherein detailed description is for the purpose of fully disclosing the invention without placing limitations thereon.

Referring to the accompanying drawings, the single FIGURE is a view schematically showing the electrical circuitry of the system embodied in the present invention.

Referring more specifically to the drawing, the invention is diagrammatically shown as being utilized in connection with a telephone cable as generally indicated at 10, this cable having an outer sheath 11 of conventional construction, the sheath being shown as having been removed to expose a plurality of cable conductors 12 constituting the conductor pairs of the telephone lines contained in the cable.

The components and instrumentalities comprising the present invention, are associated in a portable test unit as generally indicated by the numeral 13. This unit includes a voltmeter 14 or other conventional device which will respond to electrical potential, this voltmeter having a terminal 15 which is connected through a conductor 16 with terminal 4 of a plug-jack unit 17. The conductor 16 contains a ground jack 18. The other terminal 19 of the voltmeter is connected through conductor 20 with terminal 3 of the unit 17.

A branch conductor 21 is connected from conductor 20 to a half-tap jack 22, this conductor containing a resistor 23.

A main or test-tone jack 24 is provided, this jack having a sleeve 25 which is connected through conductor 26 to the juncture of resistor 23 and conductor 20. A ring contact 27 is connected through conductor 28 to terminal 1 of unit 17, while tip contact 29 of the jack is connected through conductor 30 to terminal 2 thereof.

The elements of the unit thus far described are connected by means of the plug-receptacle unit 17 with a conventional tone producing device 31 comprising an oscillator circuit which is shown as being grounded at 32. This oscillator is capable of producing a frequency of the order of five hundred cycles with a seven cycle warble, this tone having been found to be advantageous in the testing of telephone lines. The details of the tone producing device are not material to the present invention and therefore will not be specifically described herein, but reference may be made to Section G86,060.9, Issue 1, January 1949, A.T.&T. Co. Standard of the Manual of Bell System Practices, of the American Telephone and Telegraph Company, wherein such details are specifically shown and described. The tone producing device is self-contained in that it requires no outside source of current but has its own batteries.

In utilizing the unit 13, connections are made with the telephone line conductors and cable sheath by means of a grounding cord 33, half-tap cord 34 and test-tone cord 35.

The grounding cord 33 comprises a conductor 36 fitted with a clip 37 at one end which may be clipped to the grounded cable sheath 11; and a single contact plug 38 at its other end by which connection may be established with the ground jack 18.

The half-tap cord is similarly comprised of a conductor 39, clip 40 and plug 41 connectable with jack 22.

The test-tone cord comprises a conductor 42 having a clip 43 at one end and a connection to a sleeve 44 at its other end, this sleeve constituting one of the contact elements of a plug 45 adapted to mate with the jack 24. The test-tone cord also contains a pair of conductors 46 and 47 which connect a ring 48 and tip 49 of the jack to the terminal connections of a switch 50. While the switch has been illustrated as being separate from the clip 43, the switch may be constructed as a unitary part of the clip, as described in my co-pending application.

For circuit identification and tone-testing, the unit will be utilized in a manner described in detail in my co-pending application. Briefly, this may be explained as follows: with the clip 37 connected to ground, which may be the cable sheath, and clip 43 connected to a conductor, in this case conductor 12', and the switch 50 in open position, a voltage reading will be obtained which indicates whether or not the circuit is in service. When the voltmeter indicates that the circuit is not in use or that the circuit is a spare, then the switch 50 may be closed to activate the tone producing device and impose a testing tone on the circuit to permit normal procedures of testing, identifying, splicing and crossing over of lines, or other operations which may be required.

If the operation calls for opening of the conductor, for example conductor 12', this may now be proceeded with by connecting the clip 40 to an adjacently spaced point on conductor 12' from clip 43. By momentarily withdrawing the plug 45 from the jack 24, it may be noted whether or not a reading is obtained on the voltmeter 14. In the event that a reading is obtained, it indicates that the clip 40 is in actual contact with the conductor 12'. Upon replacing the plug 45, a slightly increased voltage reading will now be obtained on the voltmeter due to the fact that the previous reading through the half-tap cord 34 contained the resistor 23. A visual indication is thus made which indicates that the clips 40 and 43 are actually in contact with the conductor 12', and that the conductor between the clips 40 and 43 may now be opened without interrupting or interfering with the service on this line. Thus, the cords 34 and 35 provide an auxiliary electrical flow path between the clips 40 and 43 when the conductor 12' therebetween is opened as shown in dotted lines. Continuity is thus preserved.

Various modifications may suggest themselves to those skilled in the art, without departing from the spirit of my invention and, hence, I do not wish to be restricted to the specific forms as shown or uses mentioned, except to the extent indicated in the appended claims.

I claim:

1. A system for field testing and half-tapping a conductor of a telephone line pair in a cable, wherein full voltage is divided between the conductors of the line when the line is in service and said full voltage is applied to one of said conductors, when said line is not in service, comprising: means for selectively indicating the line voltage condition; means for tapping said indicating means to a conductor of said line through a first circuit to determine whether it is in service or not in service; and means for tapping said indicating means to said conductor of the line through a second circuit at a point adjacent the first tapping connection, said circuits having electrical characteristics such that the indication on the indicating means will differ slightly depending upon which circuit is connected.

2. A system for field testing and half-tapping a conductor of a telephone line pair in a cable, wherein full voltage is divided between the conductors of the line when the line is in service and said full voltage is applied to one of said conductors, when said line is not in service, comprising: means for selectively indicating the line voltage condition; means for tapping said indicating means to a conductor of said line through a first circuit to determine whether it is in service or not in service; and means for tapping said indicating means to said conductor of the line through a second circuit at a point adjacent the first tapping connection, one of said circuits having a resistance characteristic which differs from that of the other circuit.

3. A system for field testing and half-tapping a conductor of a telephone line pair in a cable, wherein full voltage is divided between the conductors of the line when the line is in service and said full voltage is supplied to one of said conductors, when said line is not in service, comprising: means for selectively indicating the line voltage condition; means for tapping said indicating means to a conductor of said line through a first circuit having a predetermined resistance to determine whether it is in service or not in service; and means for tapping said indicating means to said conductor of the line through a second circuit having a resistance differing from that of the first circuit at a point adjacent the first tapping connection, whereby the indication on the indicating means will vary depending upon the circuit connected.

4. A system for field testing and half-tapping a conductor of a telephone line pair in a cable, wherein full voltage is divided between the conductors of the line when the line is in service and said full voltage is applied to one of said conductors when said line is not in service, comprising: potential responsive means for selectively indicating the line condition; means for tapping said indicating means to a conductor of said line through a first circuit to determine whether it is in service or not in service; and means for tapping said indicating means to said conductor of the line through a second circuit having a resistance differing from that of the first circuit at a point adjacent the first tapping connection, whereby the indication when the first circuit is connected will be visibly reduced when the second circuit is connected.

5. A system for field testing and half-tapping a conductor of a telephone line pair in a cable, wherein full voltage is divided between the conductors of the line when the line is in service and said full voltage is applied to one of said conductors, when said line is not in service, comprising: potential responsive means for selectively indicating the line condition; means for tapping said indicating means to a conductor of said line through a first circuit to determine whether it is in service or not in service; and means for tapping said indicating means to said conductor of the line through a second circuit having a resistance characteristic less than that of said first circuit at a point adjacent the first tapping connection, said circuit providing an auxiliary electrical flow path between the tapping means, when the line conductor therebetween is opened.

6. A system for field testing and half-tapping a conductor of a telephone line pair in a cable having a grounded sheath, comprising: potential indicating means having a pair of connection terminals; tapping means for releasably connecting one of said terminals to the cable sheath; and independent tapping means for connecting the other of said terminals through separate circuits having different electrical characteristics to adjacent points on an identified conductor of a telephone line pair in a cable.

7. A system for field testing and half-tapping a conductor of a telephone line pair in a cable having a grounded sheath, comprising: potential indicating means having a pair of connection terminals; tapping means for releasably connecting one of said terminals to the cable sheath; first tapping means including a circuit for connecting the other of said terminals to a point on a conductor of a telephone line pair in said cable; and second tapping means including a circuit having a greater resistance component than the circuit of said first tapping means for connecting the other of said terminals to a second point on said conductor spaced from said first point.

8. A system for field testing and half-tapping a conductor of a telephone line pair in a cable, including a portable unit comprising: first means for tapping a conductor at a first point remote from a station test board; second means for tapping said conductor at a second point adjacently spaced from said first point; visual indicating means in circuit with said first and second tapping means responsive to changes of electrical potential in said line to indicate whether said line is in service, the circuit of one of said tapping means having a resistance component greater than the other; electrical signal producing means operatively associated with said first and second tapping means; and control means including a switch operable to activate and deactivate said signal means.

No references cited.